(12) United States Patent
Interlandi et al.

(10) Patent No.: US 12,536,180 B2
(45) Date of Patent: Jan. 27, 2026

(54) QUERY PROCESSING ON ACCELERATED PROCESSING UNITS

(71) Applicant: Microsoft Technology Licensing, LLC, Redmond, WA (US)

(72) Inventors: Matteo Interlandi, Torrance, CA (US); Wei Cui, Beijing (CN); Qianxi Zhang, Beijing (CN); Peng Cheng, Beijing (CN); Rathijit Sen, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/465,764

(22) Filed: Sep. 12, 2023

(65) Prior Publication Data

US 2024/0311380 A1    Sep. 19, 2024

Related U.S. Application Data

(60) Provisional application No. 63/490,703, filed on Mar. 16, 2023.

(51) Int. Cl.
 *G06F 16/245* (2019.01)
 *G06F 16/2453* (2019.01)

(52) U.S. Cl.
 CPC .. *G06F 16/24569* (2019.01); *G06F 16/24542* (2019.01)

(58) Field of Classification Search
 None
 See application file for complete search history.

(56) References Cited

U.S. PATENT DOCUMENTS

| | | | |
|---|---|---|---|
| 9,830,369 B1 * | 11/2017 | Ben-Natan | G06F 16/22 |
| 2003/0014393 A1 | 1/2003 | Kabra et al. | |
| 2014/0337313 A1 * | 11/2014 | Becerra | G06F 16/2453 707/713 |
| 2017/0178368 A1 * | 6/2017 | Noon | G06F 16/24568 |
| 2018/0307727 A1 * | 10/2018 | Lucas | G06F 16/24553 |

(Continued)

OTHER PUBLICATIONS

"AMD APU", Retrieved From: https://en.wikipedia.org/wiki/AMD_APU, Jun. 26, 2023, 11 Pages.

(Continued)

*Primary Examiner* — Irene Baker
(74) *Attorney, Agent, or Firm* — Weaver IP L.L.C.

(57) ABSTRACT

Query processing systems and methods are disclosed herein. In an example system, query information is received over a network for processing a query. A first processing architecture loads a set of data associated with the query into a shared memory. A second processing architecture accesses the set of data from the shared memory. In one example, the first and second processing architectures and the shared memory are integrated in a hardware chip (e.g., a chiplet containing several processor architectures, such as CPU and a graphics processing unit (GPU)). The query is processed based on the set of data accessed from the shared memory using the second processing architecture to generate a query result. The query result is provided over the network. In this manner, a computing device may execute a query based on different processing systems contained therein.

20 Claims, 8 Drawing Sheets

(56) References Cited

U.S. PATENT DOCUMENTS

| | | | | |
|---|---|---|---|---|
| 2018/0314735 | A1* | 11/2018 | Liu | G06N 20/00 |
| 2019/0354689 | A1* | 11/2019 | Li | G06N 3/045 |
| 2019/0391791 | A1* | 12/2019 | Bebee | G06F 8/4441 |
| 2020/0379740 | A1* | 12/2020 | Paek | G06N 3/045 |
| 2022/0043675 | A1* | 2/2022 | Xia | G06F 9/5027 |
| 2022/0147811 | A1* | 5/2022 | Cummins | G06F 8/41 |
| 2022/0180056 | A1* | 6/2022 | Hong | G06F 9/547 |
| 2022/0327004 | A1* | 10/2022 | Chen | G06F 9/5016 |
| 2023/0106226 | A1* | 4/2023 | Bahrami | G06N 3/04 |
| | | | | 717/110 |
| 2024/0168774 | A1* | 5/2024 | Sharan | H04L 65/403 |

OTHER PUBLICATIONS

"BlazingSQL", Retrieved From: https://github.com/BlazingDB/blazingsql, Oct. 1, 2021, 8 Pages.

"Memory redesigned to advance AI", Retrieved From: https://semiconductor.samsung.com/solutions/technology/pim/, 2023, 6 Pages.

"SK hynix Develops PIM, Next-Generation AI Accelerator", Retrieved From: https://news.skhynix.com/sk-hynix-develops-pim-next-generation-ai-accelerator/, Feb. 16, 2022, 9 Pages.

Asifuzzaman, et al., "A survey on processing-in-memory techniques: Advances and challenges", In Journal of Memories, Materials, Devices, Circuits and Systems, vol. 4, Jul. 2023, 11 Pages.

Daga, et al., "On the Effcacy of a Fused CPU+GPU Processor (or APU) for Parallel Computing", In 2011 Symposium on Application Accelerators in High-Performance Computing, Jul. 19, 2011, pp. 141-149.

He, et al., "Query Processing on Tensor Computation Runtimes", In Proceedings of the VLDB Endowment, vol. 15, Issue 11, Jul. 1, 2022, pp. 2811-2825.

Kim, Nams. , "New Computing Paradigm for AI: Processing-in-Memory (PIM) Architecture", Retrieved From: https://www.kdnuggets.com/2021/10/samsung-computing-paradigm-ai-in-memory.html, Oct. 15, 2021, 5 Pages.

Paul, et al., "Database Systems on GPUs", In Journal of Foundations and Trends® in Databases, vol. 11, Issue 1, 2021, 43 Pages.

Robinson, Cliff, "Intel Falcon Shores XPU Update at SC22", Retrieved From: https://www.servethehome.com/intel-falcon-shores-xpu-update-at-sc22/, Nov. 9, 2022, 2 Pages.

Saecker, et al., "Big Data Analytics on Modern Hardware Architectures: A Technology Survey", In Published of Business Information Processing book series, LNBIP, vol. 138, Jul. 2012, pp. 125-149.

Shanbhag, et al., "A Study of the Fundamental Performance Characteristics of GPUs and CPUs for Database Analytics", In Proceedings of the ACM SIGMOD International Conference on Management of Data, Jun. 14, 2020, pp. 1617-1632.

Smith, Ryan, "CES 2023: AMD Instinct MI300 Data Center APU Silicon In Hand—146B Transistors, Shipping H2'23", Retrieved From: https://www.anandtech.com/show/18721/ces-2023-amd-instinct-mi300-data-center-apu-silicon-in-hand-146b-transistors-shipping-h223, Jan. 5, 2023, 7 Pages.

Suhan, "HeavyDB", Retrieved From: https://github.com/heavyai/heavydb, Dec. 14, 2022, 13 Pages.

International Search Report and Written Opinion received for PCT Application No. PCT/US2024/019284, Jul. 5, 2024, 15 pages.

Jiesong, et al., "Exploring Query Processing on CPU-GPU Integrated Edge Device", IEEE Transactions on Parallel and Distributed Systems, IEEE, USA, vol. 33, No. 12, May 25, 2022, pp. 4057-4070.

International Preliminary Report on Patentability (Chapter I) received for PCT Application No. PCT/US2024/019284, Sep. 25, 2025, 09 pages.

* cited by examiner

500

600

QUERY PROCESSING ON ACCELERATED PROCESSING UNITS

CROSS-REFERENCE TO RELATED APPLICATIONS

This application claims priority to U.S. Provisional Patent Application No. 63/490,703, filed on Mar. 16, 2023, titled "Query Processing on Gaming Consoles," the entirety of which is incorporated by reference herein.

BACKGROUND

Typically, traditional central processing units (CPUs) are utilized to handle database workloads. While the performance of CPUs has increased over time, such as by implementing different hardware instructions or compiling techniques, utilization of CPUs in database workloads still comprises inefficiencies, such as limited memory access capabilities, parallel processing, and other scaling limitations. Although other types of hardware have been explored to address these limitations, such hardware typically has other constraints that limit the overall performance gains.

SUMMARY

This Summary is provided to introduce a selection of concepts in a simplified form that are further described below in the Detailed Description. This Summary is not intended to identify key features or essential features of the disclosed subject matter, nor is it intended to be used to limit the scope of the disclosed embodiments.

Query processing systems and methods are disclosed herein. In an example system, query information is received over a network for processing a query. A first processing architecture loads a set of data associated with the query into a shared memory. A second processing architecture accesses the set of data from the shared memory. In one example, the first and second processing architectures and the shared memory are integrated in a hardware chip (e.g., a chiplet containing several processor architectures, such as CPU and a graphics processing unit (GPU)). The query is processed based on the set of data accessed from the shared memory using the second processing architecture to generate a query result. The query result is provided over the network. In this manner, a computing device may execute a query based on different processing systems contained therein.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
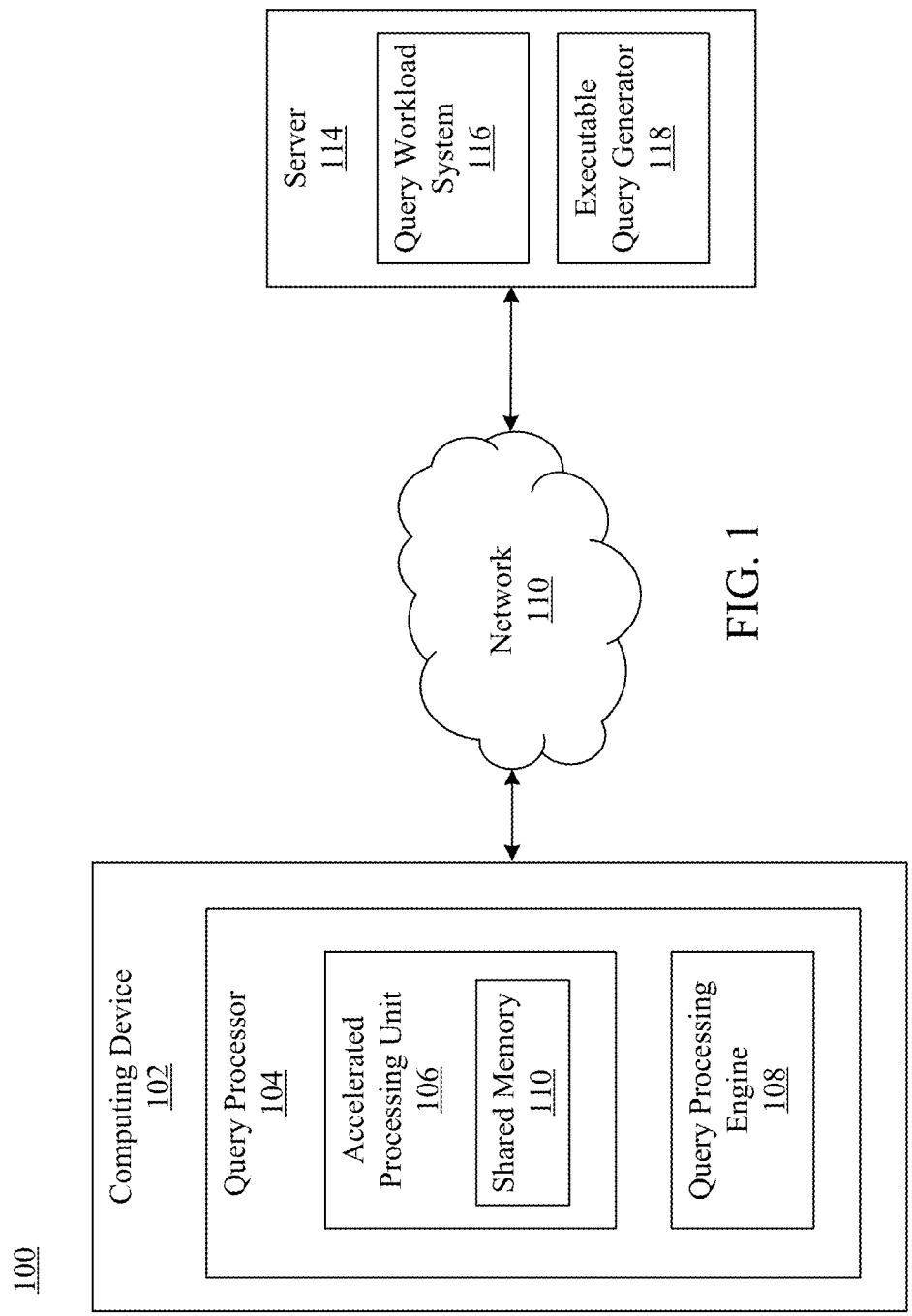
FIG. 1 shows a block diagram of a system for processing a query on a computing device, according to an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Typically, traditional CPUs are utilized to handle database workloads. While the performance of CPUs has increased over time, such as by implementing different hardware instructions or compiling techniques, utilization of CPUs in database workloads still comprises inefficiencies, such as limited memory access capabilities, parallel processing, and other scaling limitations. Although other types of hardware have been explored to address these limitations, such hardware typically has other constraints that limit the overall performance gains.

For instance, alternative hardware that is embodied in standalone or discrete chips such as Graphics Processing Units (GPUs), Field Programmable Gate Arrays (FPGAs), or other standalone hardware accelerators, which often have more processing cores and higher memory bandwidth, have been employed in an attempt to improve parallelization and memory access capabilities compared to CPUs. Such hardware is coupled to other computing components (such as a CPU) via a computing bus, such as a PCIe bus, that has a data bandwidth far lower than the processing capabilities of the standalone chips. In addition, these types of chips do not utilize a shared memory with a CPU of a computing system. Thus, for processing to take place on the hardware accelerator, data is transferred from another memory (e.g., a CPU memory) to the standalone accelerator that is on a separate chip over a relatively slower computing bus. Accordingly, even with these alternative types of hardware, bottlenecks still exist (e.g., due to constraints of a bus that is used for the transfer of data between a CPU and a standalone accelerator that is implemented on a chip separate from the CPU) that limit their performance.

Embodiments described herein are directed to processing a query. In an example system, query information is received over a network for processing a query. In one example, the query information is received in a computing device that comprises a chiplet containing several processor architectures, such as CPU and a graphics processing unit (GPU). A first processing architecture loads a set of data associated with the query into a shared memory. A second processing architecture accesses the set of data from the shared memory. In an example system, the first processing architecture, second processing architecture, and shared memory are integrated in a hardware chip (e.g., in a single package or die). The query is processed based on the set of data accessed from the shared memory using the second processing architecture (e.g., the GPU) to generate a query result. The query result is provided over the network. In this manner, a computing device may execute a query based on different processing systems contained therein.

The techniques described herein advantageously provide improvements to computer processing, and in particular improved utilization of computer resources and improved overall performance. For instance, by utilizing processor components with a combined architectures (e.g., a CPU and GPU), increased computation power (e.g., due to a higher number of processing cores) and high memory bandwidth can be advantageously leveraged to efficiently execute queries (e.g., 2× the memory bandwidth of CPU-only machines and 12 Petaflops in an example implementation), thereby allowing for faster or accelerated query processing.

In addition, bottlenecks (e.g., due to the limited capacity of a computer bus, such as a PCIe bus) can be minimized or even avoided in a combined architecture (e.g., CPU/GPU) implementation, which can further improve the overall performance. For instance, in other systems where a standalone accelerator-based processor (e.g., a GPU, which can have thousands of cores, compared to only dozens of cores in CPUs) is used to carry out computations, data utilized by the GPU must first be transferred to a memory of the CPU (which is typically larger than the memory of a GPU), after which the GPU can access the data over a computer bus (e.g., a PCIe bus). However, computer buses typically have a relatively slow bandwidth, resulting in a bottleneck that slows down processing. By utilizing memory that is shared between two processing architectures (e.g., a CPU and GPU), the GPU may retrieve the data stored therein by accessing the memory directly (i.e., without the need to access the data over a computer bus), thereby improving the speed at which processing can occur. Stated differently, integration of multiple processing architectures (e.g., an accelerator and a CPU) and a shared memory on a single hardware chip allows for data access to be performed by the components integrated therein in a quicker fashion (e.g., by using a direct memory access which is not available for standalone accelerator implementations). Not only is the access speed of such data improved, but enhanced processing capabilities of the hardware accelerator can also be realized by reducing or eliminating the data access bottleneck compared to other techniques. Based at least on these advantages, and other advances described herein, the disclosed techniques can improve various aspects of computing devices and computer processing.

Still further, disclosed techniques allow for queries to be executed on alternative systems (e.g., systems containing processing chips with combined architectures) that can execute queries with improved resource utilization. Thus, rather than executing queries on systems that have lesser overall performance, executables can be generated by a first system (e.g., a server) that is transmitted over a network to the alternative system that can execute the query with improved performance and return the results to an appropriate endpoint after processing. In this manner, the resources and computing power of different systems can be efficiently utilized to perform different tasks associated with executing a query.

Example implementations will now be described that are directed to techniques for processing a query. For instance, FIG. 1 shows a block diagram of a system 100 for processing a query in a computing device, according to an example embodiment. As shown in FIG. 1, system 100 includes a computing device 102, a network 110, and a server 114.

Network 110 may comprise one or more networks such as local area networks (LANs), wide area networks (WANs), personal area network (PANs), enterprise networks, the Internet, etc., and may include wired and/or wireless portions. Gaming console 102 and server 114 may be communicatively coupled via network 110. In an implementation, gaming console 102 and server 114 may communicate via one or more application programming interfaces (API), and/or according to other interfaces and/or techniques. Gaming console 102 and server 114 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Computing device 102 comprises a query processor 104 configured to process one or more queries. Query processor 104 comprises an accelerated processing unit 106 and a query processing engine 108. Accelerated processing unit 106 comprises a shared memory 110. In various implementations, query processor may comprise one or more other components not expressly illustrated, such as other hardware devices or components (e.g., memory, processors, etc.).

In examples, computing device 102 comprises a device that contains an accelerated processing unit (APU). In examples, APU 106 comprises one or more processing systems. Each processing system may comprise a different processing architecture. In some examples, APU 106 is a chiplet or hardware chip that comprises a plurality of processing architectures and shared memory 110 that is shared between the processing architectures. In various embodiments, one or more of the processing architectures is a CPU and a hardware accelerator, such as a GPU. It should be understood that other types of accelerators may also be implemented within APU 106, such as a field programmable gate array (FPGA), an application specific integrated circuit (ASIC), or other types of accelerators. various embodiments, the plurality of processing architectures (e.g., a CPU and an accelerator such as a GPU) are integrated or implemented on a single package (e.g., a die) or hardware chip, to form a combined chiplet. In implementations, each processing system may comprise a plurality of computing cores. For instance, one processing system (e.g., the GPU) may comprise a greater number of processing cores than another processing system (e.g., the CPU) of APU 106.

While computing device 102 is illustrated in FIG. 1, it should be understood that disclosed techniques may implement other types of computing devices in addition to, or as an alternative to, the one illustrated. For instance, disclosed techniques may be carried out using other types of computing devices that comprise an accelerated processing unit (APU), such as a gaming console that contains a processing chip with multiple processing architectures. In examples, a gaming console comprises a device configured to output a video signal comprising one or more video frames (e.g., of video game 108) for presentation on a display screen. For instance, the gaming console may comprise a video game console (e.g., a Microsoft Xbox® of any version, a Sony PlayStation® of any version, A Nintendo Wii®, NES, or Switch™ of any version, etc.), a desktop computer, a portable computer, a smartphone, a tablet, a wearable computing device, a head mounted gaming device, a mixed and/or virtual reality device (e.g., Microsoft HoloLens™), or any other processing device for executing one or more video games (e.g., video game applications) and outputting video frames generated by the video game, such as to a display device (co-located with the gaming console 102 and/or located remotely). Although not shown in FIG. 1, a display device of the gaming console may comprise any type of display suitable for receiving and displaying video frames generated by a video game. For instance, the display device may be a liquid crystal display, cathode ray tube display, light-emitting diode display, a plasma display, a display screen of a projector television, or any other type of display that may be coupled to the gaming console through a suitable interface. The display device of the gaming console may either be external to or incorporated in the gaming console. An example computing device that may incorporate the functionality of computing device 102 is discussed below in reference to FIG. 10. Any number of computing devices (e.g., gaming consoles) may be present in implementations in accordance with the disclosed techniques.

In examples, shared memory 110 comprises a memory device utilized by APU 106 (e.g., by a plurality of processing systems implemented therein). In various implementations, memory 110 is integral or part of APU 106 (e.g., on the same package). In some examples, shared memory 110 comprises an on-chip memory that is directly accessed by the various processing architectures implemented on APU 106. For instance, each processing architecture of APU 106 may access data stored in shared memory 110 via direct memory access (DMA). In various examples, data accessed by each such processing architecture from shared memory 110 is not transmitted over a computing bus (e.g., a PCI or PCIe bus) during such access. In this manner, data transmitted between different processing systems of APU 106 need not be transmitted over a computer bus, which may reduce overhead when performing operations such as executing a query. In some further implementations, a processing system (e.g., a GPU) of APU 106 may comprise a direct storage connection to a storage device (which may be part of shared memory 110 or a separate storage device) on computing device 102, such that the processing system can transfer data at relatively high speeds, thereby further improving performance. Examples of such memory devices are described below with reference to FIG. 10.

Query processing engine 108 is configured to receive query information for one or more queries and process the query information to generate a query result. In examples, the query information may comprise information to execute one or more database queries, such as a Structured Query Language (SQL) query. In some implementations, the query information may be received over network 110, such as from query workload system 116 of server 114. In some other implementations, the query information may be received from a device local to computing device 102 (e.g., via a local computing device), or received via a user input.

In implementations, query processing engine 108 may be configured to access (which includes causing another component to access) a set of data associated with the query information. For instance, query processing engine 108 may cause APU 106 to access data that is stored remotely (e.g., on the cloud, at server 114, or in another remote location). In other implementations, the data may be stored locally to computing device 102 (e.g., on a storage device internal to computing device 102 or communicatively coupled thereto). In another implementation, the data may be transmitted from (or caused to be transmitted by) query workload system 116 along with the query information. In various examples, data utilized by APU 106 to process the query is transferred to shared memory 110. In some examples, the data used to process the query is transferred to the shared memory in response to an instruction executed by a CPU of APU 106.

In various examples, query processing engine 108 processes one or more queries based on the received query information using a plurality of processing architectures (e.g., APU 106) over a set of data associated with the query. In some implementations, the processing of the query may be achieved without transmitting a portion of the set of data accessed for processing the query over a peripheral component interconnect (PCI) or PCI express (PCIe) computing bus. For instance, once a first processing architecture (e.g., a CPU) of APU 106 causes the data to be stored in shared memory 110, a second processing architecture (e.g., a GPU) of APU 106 may directly access the data in shared memory 110, such as via a direct memory access. In this manner, the second processing architecture need not obtain the data over a computing bus, which can improve the speed of execution of the query.

In an example implementation, the query information received by query processing engine 108 comprises an executable generated based on operations performed on an input query. For instance, the query information may be generated based at least on a machine learning (ML) framework or compiler configured to automatically compile a query (e.g., an SQL query) into an executable. Examples include PyTorch, Antares, and others, as will be appreciated by those skilled in the relevant arts. The executable may be generated by server 114 in some implementations. In other implementations, computing device 102 or another computing device may generate the executable. In examples, such ML frameworks and compilers may also be used for optimizing queries to be executed by query processing engine 108. Further details regarding the generation of the executable are described in greater detail below.

Query processing engine 108 may process the query to generate a query result, and provide the query result over a network (e.g., to server 114). In other examples, the query result may be provided locally (e.g., via a display coupled to computing device 102, to a computing device local to computing device 102, and/or provided for storage in a storage device internal or external to computing device 102). In another implementation, the result of the query may be provided to an end-user computing device (e.g., a device from which the query was inputted) or any other device or platform not expressly shown (e.g., a data analytics machine, a dashboard, etc.).

Server 114 comprises a query workload system 116 and an executable query generator 118. Server 114 comprises any one or more server devices or other computing devices for receiving a query to be executed. An example computing device that may incorporate the functionality of server 114 is described below in reference to FIG. 10. In examples, the query to be executed may originate from another computing device (not shown) via a suitable user interface, including but not limited to an application, a web-based interface, or any other interface in which a query can be generated (automatically and/or manually) for execution. The query may be generated for execution against a set of data, such as for analytics or other purposes. The query may comprise a SQL query or any other type of query as appreciated by those skilled in the art.

Upon generation, the query may be transmitted to query workload system 116. In examples, query workload system 116 may be configured to manage the receipt, processing and/or distribution of queries (and/or query results) across one or more devices coupled to network 110. In some implementations, query workload system 116 (or executable query generator 118) may transmit the query information (e.g., an executable) for processing a query to computing device 102. In some further embodiments, query workload system and/or executable query generator 118 transmits, causes to transmit, or makes accessible to computing device 102 a set of data associated with the query information.

Executable query generator 118 is configured to generate query information from a received query. The query information generated by executable query generator 118 comprises an executable or other code (e.g., source code, assembly code, machine code, etc.) to be executed by computing device 102. In one example implementation, when a query is received, executable query generator 118 is configured to parse and/or optimize the query. The query may be parsed and/or optimized in various ways, such as by utilizing Apache Spark or another program. Upon parsing and/or optimizing the query, executable query generator 118 may generate a physical query plan that comprises one or more query operators (e.g., in the form of a graph, such as a directed acyclic graph (DAG)). In examples, the graph may comprise a representation of how to execute each operator (e.g., SQL operators) in order to generate a query result.

In some implementations, one or more passes are performed over the graph. For instance, executable query generator 118 may analyze the graph starting with a high level description of each of the operators, and generate a set of code (e.g., in a computer language or a program) that is specific to the graph and/or operators contained therein. In some implementations, the set of code comprises a neural network, deep neural network, or tensor program, which may be configured for execution by one or more processing architectures (e.g., a GPU).

Executable query generator 118 may further compile and/or optimize the program. For instance, a component within executable query generator 118 may take, as an input, the set of code (e.g., the neural network program), optimize the code using one or more techniques (e.g., fusing, tuning, etc.), and generate a set of assembly code (or other code) that can be transmitted to computing device 102 for execution. In examples, the set of assembly code (or other code) generated by executable query generator 118 may be generated based on the target hardware that will be used for executing the code, such as the APU present in computing device 102. For instance, where APU 106 comprises a CPU and a GPU, the set of assembly code (or other code) may be generated in such a manner as to identify how different portions of the code should be processed using the different processing systems of APU 106 (e.g., to improve performance).

In one example implementation, a plurality of computing devices may be present in an implementation, each coupled to network 110, thereby resulting in a cloud of connected computing devices (e.g., in a data center), where each computing device is configured to process one or more queries, or portions thereof). In such an example, data analytics may be performed based on a time of usage or demand (e.g., hours, days, weeks) when the computing devices (e.g., gaming consoles). For instance, where the gaming consoles are primarily being used for gaming (e.g., as a cloud-based gaming infrastructure) during certain times or days (e.g., evening and/or weekend hours), while having less demand or load during other times, these other times of lower demand or load may be used for processing queries on those same devices as described herein. In this manner, predictable patterns of gaming behaviors may be utilized to determine when those same systems (which include APUs) may be utilized for other purposes (e.g., query execution).

It will be appreciated to those skilled in the relevant arts that implementations are not limited to the illustrative arrangement shown in FIG. 1. For example, any one or more of the components illustrated in FIG. 1 may be implemented on computing devices not expressly shown, such as one or more cloud-based server devices. In addition, any one or more additional components or subcomponents may also be present that are not expressly illustrated in FIG. 1, in accordance with the example embodiments herein.

Figure 2:
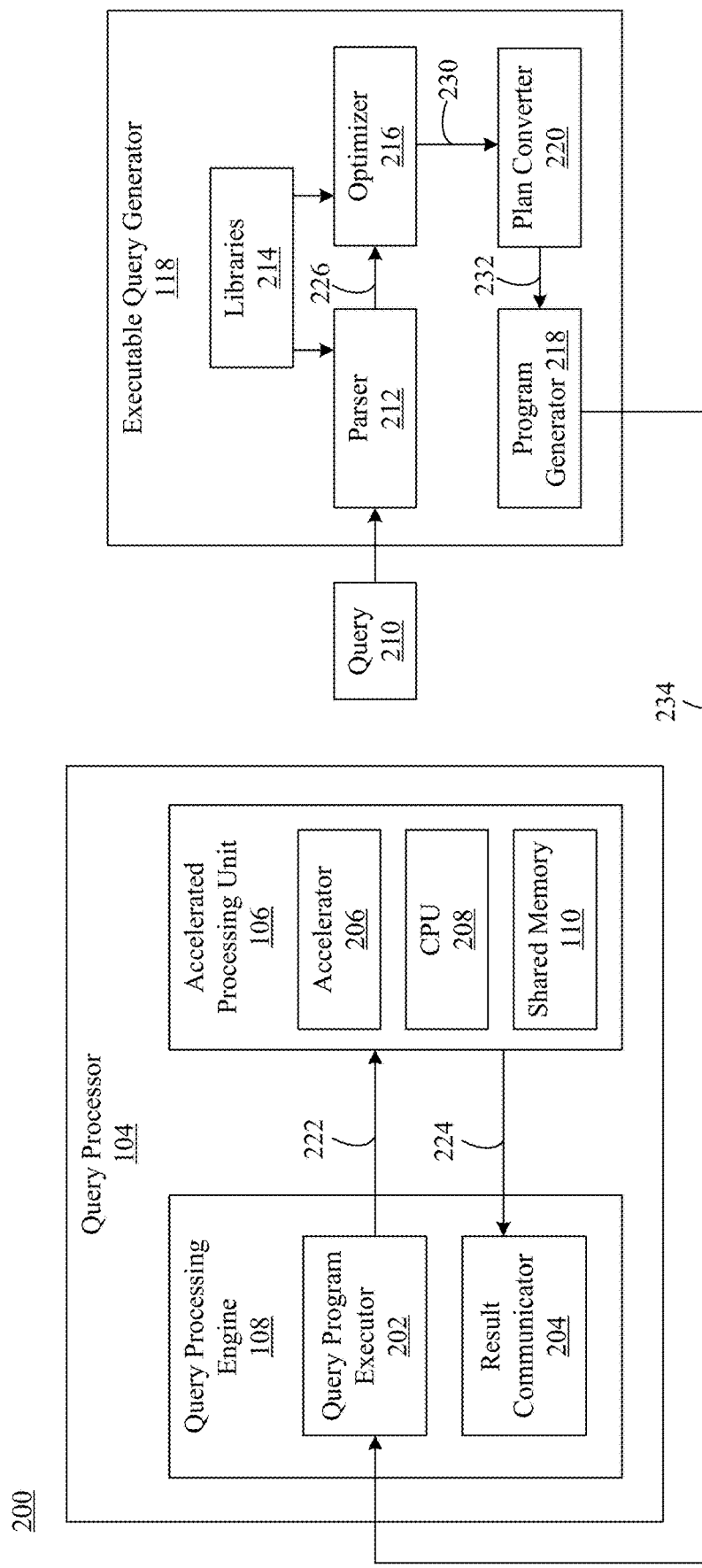
FIG. 2 shows a block diagram of another system for processing a query on a computing device, according to an example embodiment.

FIG. 2 depicts a block diagram of another system for processing a query on a computing device, according to an example embodiment. As shown in FIG. 2, system 200 includes example implementations of query processor 104 and executable query generator 118, and a query 210. Query processor 104 includes example implementations of query processing engine 108 and APU 106. Query processing engine 108 comprises a query program executor 202 and a result communicator 204. APU 106 comprises an accelerator 206, a CPU 208, and an example implementation of shared memory 110. As shown in FIG. 2, executable query generator 118 includes a parser 212, a set of libraries 214, an optimizer 216, a program generator 218, and a plan converter 220.

In examples, executable query generator 118 obtains query 210 and generates query information 234 comprising an executable for processing the query. Query program executor 202 provides the query information 222 to APU 106 for execution, which may be carried out by any one or more processing architectures implemented therein. Upon processing, APU 106 generates a query result and returns the query result 224 to result communicator 204, which may perform any number of actions in response (e.g., storing the result, transmitting the result, etc.). Further details regarding the operation and functionality of system 200 are described below.

Query 210 comprises any type of input string that is to be executed by a computer program. In examples, query 210 can be user-generated (e.g., received by a user-interface of a computing device) or automatically generated (e.g., by an analytical program or dashboard). In some embodiments, query 210 identifies one or more operations to be executed against a set of data. For instance, query 210 identifies operations (e.g., select, update, parameter, etc.) to be performed against one or more fields of a database. In some examples, query 210 identifies a particular field(s), row(s), column(s), or database(s) upon which the operations are to be performed. In some implementations, query 210 comprises a Structured Query Language (SQL) query, though other types of queries written in other languages are also contemplated herein.

In various implementations, query 210 also identifies, or is accompanied by an identification of, a desired processing architecture on which the query should be executed. For instance, query 210 may comprise information indicating that the query should be executed on an accelerator if one is available for execution, or on a CPU, or both. In some implementations, the identification of the desired processing architecture is specified in a parameter of query 210.

Parser 212 is configured to obtain and parse query 210. For instance, parser 212 parses the query by accessing one or more libraries 214. Libraries 214 may comprise, for example, a mapping of different strings (e.g., operations) specified in the query to database operators. For instance, parser 212 may be configured to generate a physical query plan 226 comprising a graph of operators (e.g., physical database operators) as specified by libraries 214. In some implementations, the query plan comprises a Directed Acyclic Graph (DAG).

Optimizer 216 is configured to optimize query 210 and/or the physical query plan as generated by parser 212. For instance, optimizer 216 may be configured to access libraries 214 to perform one or more optimizations to improve an execution efficiency of query 210. In some examples, optimizer 216 may select a particular query plan from among a plurality of query plans generated by parser 214, based on a resource cost (e.g., a cost or time of execution).

The query may be parsed and/or optimized in various ways, such as by utilizing Apache Spark or another program. Upon parsing and/or optimizing the query, executable query generator 118 may generate a physical query plan that comprises one or more query operators (e.g., in the form of a graph). In examples, the graph may comprise a representation of how to execute each operator (e.g., SQL operators) in order to generate a query result.

In an example system, plan converter 220 obtains a physical query plan 230 from optimizer 216 and generates a set of code based thereon. In various embodiments, plan converter 220 performs one or more passes over the physical query plan (e.g., the graph). For instance, plan converter 220 may analyze the graph starting with a high level description of each of the operators, and generate a set of code (e.g., in a computer language or a program) that is specific to the graph and/or operators contained therein.

In some implementations, the set of code comprises a neural network, deep neural network, or tensor program, which may be configured for execution by one or more processing architectures (e.g., a GPU). In some examples, plan converter 220 utilizes a machine-learning framework to generate the set of code.

In one example, plan converter 220 loads the obtained query plan into memory and subsequently traverses the graph. For each operator in the graph, plan converter 220 identifies a corresponding code implementation (e.g., computing logic). For instance, plan converter 220 accesses a dictionary that contains a mapping of operators to code implementations, and uses the dictionary to identify a set of code implementations for the graph. In one implementation, the set of code implementation comprises a program, such as a neural network (or other ML or artificial intelligence (AI)) program. In one example, as discussed above, plan converter 220 comprises a ML framework to generate the code implementation. An example of such a framework is a PyTorch® framework that generates a PyTorch® program (e.g., a neural network program) and TensorFlow®. These examples are only illustrative, and other types of frameworks, including both ML and non-ML frameworks, are also contemplated. In this manner, parser 212, optimizer 216, and/or plan converter 220 may convert query 210 into a set of code.

In example embodiments, plan converter 220 generates the code implementations such that the code can be executed over different types of hardware (e.g., on different architectures). In some implementations, the code implementations target hardware that enables parallel processing (e.g., by multi-threading or utilizing multiple processing cores) of the query. In some embodiments, plan converter 220 exports the generated set of code implementations (e.g., the program) into a separate library for retrieval by program generator 218.

Program generator 218 may obtain the set of code 232 from plan converter 220 and compile and/or optimize the set of code (e.g., the program). For instance, program generator 218 may take, as an input, the set of code (e.g., the neural network program), optimize the code using one or more techniques (e.g., fusing, tuning, etc.), and generate a set of assembly code (or other code) that can be transmitted to computing device 102 for execution. In examples, the set of assembly code (or other code) generated by program generator 218 may be generated based on the target hardware that will be used for executing the code, such as the APU present in computing device 102. For instance, where APU 106 comprises a CPU and a GPU, the set of assembly code (or other code) may be generated in such a manner as to identify how different portions of the code should be processed using the different processing systems of APU 106 (e.g., to improve performance). In some examples, program generator 218 generates the set of assembly code based on a particular target architecture, such as a desired architecture identified in query 210 (e.g., based on an indication that the query should be executed on a particular architecture).

In one example, program generator 218 generates target-specific code that is mapped to each portion of the code implementation generated by plan converter 220. For instance, based on the target architecture (e.g., the hardware that will be utilized for executing the executable corresponding to the query), program generator 218 generates a set of code from the set of code implementations. In other words, program generator 218 may be configured to represent each code implementation corresponding to an operator of the query plan to code that can be executed on the target hardware.

In some further embodiments, program generator 218 may perform one or more optimizations on the generated code to further improve a processing efficiency, such as by improving the utilization of multi-threading for certain types of hardware architectures. In examples, program generator 218 compiles the code to generate query information (e.g., an executable such as a binary) 234 that can execute on the target architecture.

In examples, query program executor 202 obtains query information 234 (e.g., over a network). Query program executor 202 transmits the query information 222 to APU 106 for processing. APU 106 processes the query information using at least one of accelerator 206 and/or CPU 208. In examples, accelerator 206 and CPU 208 access shared memory 110 (e.g., via a direct memory access) to improve processing speeds. It should be understood that while APU is described as containing two processing architectures (accelerator 206 and CPU 208), such an implementation is only meant to illustrative. APU 106 may contain any number of different processing architectures, all integrated on a single chiplet and sharing a common memory that can be accessed directly.

In examples, accelerator 206 comprises a processor component for executing program code that includes a hardware accelerator for executing. In various embodiments, accelerator 206 comprises a relatively large number of processing cores (e.g., in the hundreds or thousands). In some examples, one or more of such processing components is a tensor processing unit (TPU), a graphics processing unit (GPU), a field-programmable gate array (FPGA), an Application Specific Integrated Circuit (ASIC), or other specialized hardware processor that may execute certain types of processing in an accelerated fashion (e.g., with a large number of processing cores).

CPU 208 comprises a processing component for executing program code. In examples, CPU 208 is configured to receive query information 222 and cause data to be loaded in shared memory 110 that is needed for processing the query information. For instance, CPU 208 may preload or prefetch the data for storing into shared memory 110 needed prior to processing of the query information (e.g., by accelerator 206), such that the data is present in the shared memory at the time accelerator 206 begins processing the query. In other words, in various implementations, CPU 208 may be configured to manage the input and output of data to and/or from shared memory 110 from components external to APU 106. Thus, even where accelerator 206 is executing the query information, CPU 208 is responsible for performing certain input/output functions of shared memory 110.

In examples, accelerator 206 is configured to directly access data in shared memory 110. For instance, rather than relying on data transfers over a computer bus (e.g., a PCIe bus), accelerator 206 may directly access data needed for processing query information from shared memory 110 (e.g., using DMA techniques). Once accelerator 206 completes processing of the query information (or portions of the query information), accelerator 206 may access shared memory 110 directly to store such results (e.g., without the need to transmit data to CPU 208 over a PCIe bus). This is in contrast with certain other implementations (e.g., with standalone GPUs), where data must be accessed and/or transmitted over a PCIe bus to a CPU, resulting in a bottleneck and an overall reduction in performance. Thus, by allowing accelerator 206 and CPU 208 to utilize shared memory 110 for query processing (e.g., utilizing the same physical memory component), query processing can be improved.

Upon processing the query information, CPU 208 may access a set of query results from shared memory 110 (e.g., via a DMA) and provides the query results 224 to result communicator 204. In examples, result communicator 204 is configured to transmit (e.g., via a network) the query results to an endpoint. In implementations, the endpoint can be any destination where results are to be stored and/or reported, including but not limited to a storage device or cache local to query processor 104, an external storage (e.g., a cloud-based storage), query workload system 116, and/or an application or interface from which query 210 was generated. These are only examples, and other endpoints are also contemplated, as will be appreciated by those skilled in the relevant art.

Figure 3:
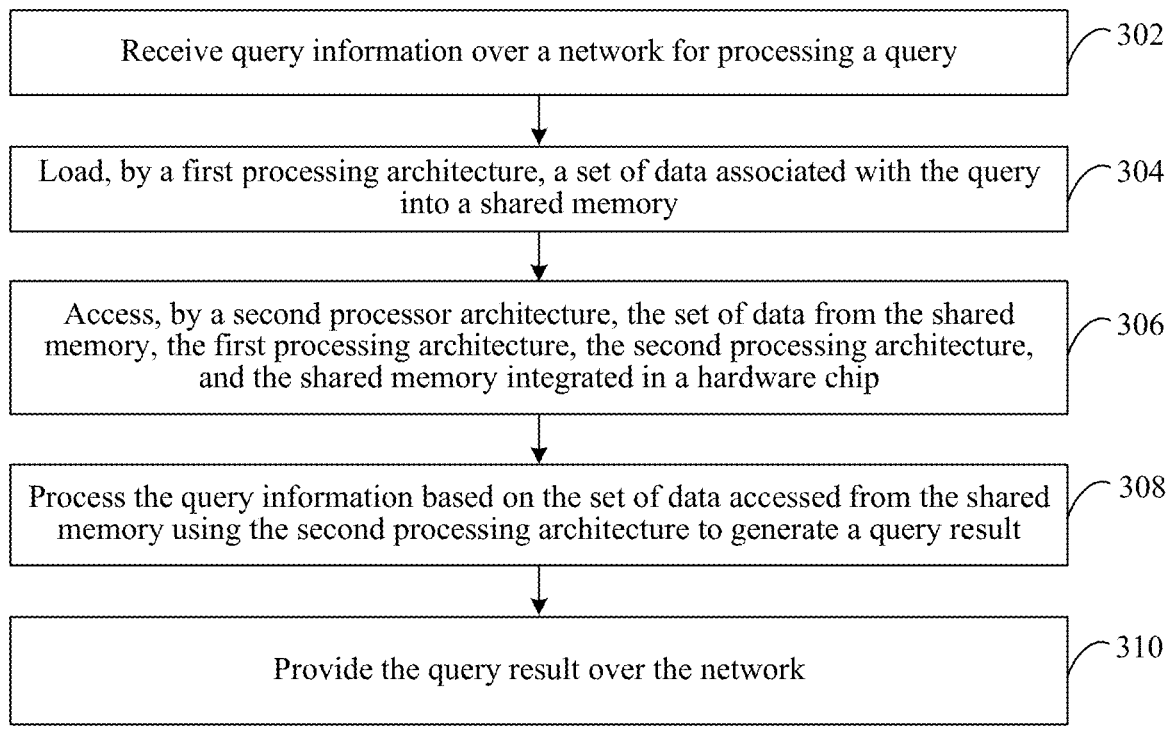
FIG. 3 shows a flowchart of a method for processing a query, in accordance with an example embodiment.

Accordingly, query processing is performed by executable query generator and/or query processor 104 in various ways. For example, FIG. 3 shows a flowchart 300 of a method for processing queries, in accordance with an example embodiment. In an embodiment, flowchart 300 is implemented by system 100 as shown in FIG. 1 and/or system 200 as shown in FIG. 2. Accordingly, flowchart 300 will be described with reference to FIGS. 1 and 2. Other structural and operational embodiments will be apparent to persons skilled in the relevant art(s) based on the following discussion regarding flowchart 300, system 100 of FIG. 1 and system 200 of FIG. 2.

Flowchart 300 begins with step 302. In step 302, query information is received over a network for processing a query. For instance, with reference to FIGS. 1 and 2, query program executor 202 is configured to receive query information 234 over network 110. In examples, the query information is associated with query 210. For instance, as discussed earlier, executable query generator 118 may convert query 210 (e.g., received via an interface or through other means) into an executable in various ways for processing by APU 106. Upon generation of the executable, executable query generator 118 provides the executable to query processor 104 for processing.

In step 304, a set of data associated with the query is loaded into a shared memory by a first processing architecture. For instance, with reference to FIG. 2, a first processing architecture (e.g., CPU 208) loads data associated with query 210 into shared memory 110. The data loaded in shared memory 110 may be identified based on information contained in query information 234. In various examples, the first processing architecture may be configured to retrieve the data from a data source, such as a database. For instance, the set of data (e.g., which may comprise database data) may be retrieved from a storage that is located within computing device 102, or located remotely (e.g., in a data repository, in a cloud, in a server, etc.). In implementations, the set of data may comprise any number of fields, rows, and/or columns needed to execute query 210.

Accordingly, in examples, the data associated with the query may be preloaded into shared memory 110 by CPU 208. For instance, upon APU 106 receiving the query information for processing, CPU 208 may be configured to cause the appropriate set of data associated with the query to be retrieved from the appropriate storage (e.g., local to computing device 102 or remotely located), and store the data in shared memory 110 for accessing by the second processing architecture.

In step 306, the set of data associated accessed from the shared memory by the second processing architecture. In examples, shared memory 110 is present on a hardware chip that contains a first processing architecture and a second processing architecture, such that each of the foregoing components are integrated into the hardware chip (e.g., a single hardware chip), as discussed above. In accordance with various embodiments, query program executor 202 provides the query information to APU 106 that comprises both processing architectures and shared memory 110.

In examples, both the first processing architecture and the second processing architecture (e.g., accelerator 206 and CPU 208) may access data stored on shared memory 110 directly (e.g., via a DMA). For instance, one of the processing architectures (such as accelerator 206, if the query information is to be executed by an accelerator) is configured to access data associated with the query from shared memory 110. In this manner, accelerator 206 may access the data from the shared memory needed to process the query information without transferring the data to the accelerator over a communication bus. In other words, since CPU 208 is configured to load the data into shared memory 110, accelerator 206 may directly access such data that is already loaded in the shared memory, without having to transfer the data to the accelerator over a PCIe bus or similar communication bus.

In step 308, the query information is processed based on the set of data accessed from the shared memory using the second processing architecture to generate a query result. For instance, with reference to FIG. 2, the second processing architecture (e.g., accelerator 206) is configured to process the query information based on the set of data accessed from shared memory 110 to generate a query result. In examples, the processing architecture(s) that execute the query information execute one or computer instructions as defined in the query information against the data retrieved from shared memory 110 to generate query result 224.

In one example, one of the processing architectures (e.g., either accelerator 206 or CPU 208) carries out the execution of the query information. For example, if query 210 indicates that the target processing architecture is an accelerator, the query information may be generated by executable query generator 118 in a manner such that accelerator 206 carries execution of the query information (e.g., by utilizing a larger number of processing cores, compared to CPU 208). In other examples, the query information may be executed by CPU 208. In yet another example, the query information may be executed by a combination of accelerator 206 and CPU 208.

Upon generation of the query result, the processing architecture may be configured to store the query result in shared memory 110 (e.g., via a direct memory access).

In step 310, the query result is provided over the network. For instance, with reference to FIG. 2, CPU 208 may be configured to access the query result from shared memory 110 and provide the query result 224 to result communicator 204. In examples, result communicator of query processing engine 108 may provide the query result to an endpoint. In one example, the endpoint may be a separate computing device (e.g., server 114, a computing device of a user that generated the query, a computing device in which a dashboard displaying query results is to be presented, or various other computing devices). In another example, the query result is stored in a storage device that may be local to query processor 104 or remotely located.

Figure 4:
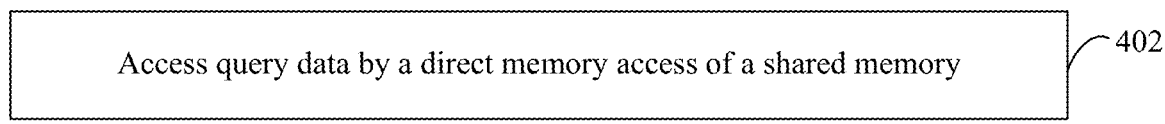
FIG. 4 shows a flowchart of a method for accessing a shared memory during query processing, in accordance with an example embodiment.

As discussed above, a shared memory can be utilized by processing architectures integrated into APU 106. For example, FIG. 4 shows a flowchart of a method for accessing a shared memory during query processing, in accordance with an example embodiment. In an embodiment, flowchart 400 may be implemented by system 100 as shown in FIG. 1 and/or system 200, as shown in FIG. 2. Accordingly, flowchart 400 will be described with continued reference to FIGS. 1 and 2. Other structural and operational embodiments will be apparent to persons skilled in the relevant art(s) based on the following discussion regarding flowchart 400, system 100 of FIG. 1, and system 200 of FIG. 2.

Flowchart 400 begins with step 402. In step 402, query data is accessed by a direct memory access of a shared memory. For instance, with reference to FIGS. 1 and 2, any one or more of the processing architectures integrated in APU 106, such as accelerator 206 and/or CPU 208, are configured to access data associated with query 210 from shared memory 110 via a direct memory access (DMA). For example, using a DMA technique, a physical address (e.g., a pointer or the like) may identify an address of the memory where the data associated with the query is stored. In examples, one processing architecture may provide the address to another processing architecture (e.g., the CPU may provide the address to the accelerator) in various ways, such as by transmitting a packet using a communication channel or using a register write. Once the appropriate processing architecture obtains the physical address, shared memory 110 may be accessed at the identified physical address to obtain the query data directly. In this manner, the access of the data by one processing architecture (e.g., the accelerator) does not comprise transmitting the query data between the first processing architecture (or a shared memory associated therewith) over a communication bus, such as a PCIe bus. Rather, the shared memory is directly accessed, thereby speeding up the transfer of data that is needed for processing the query information.

Figure 5:
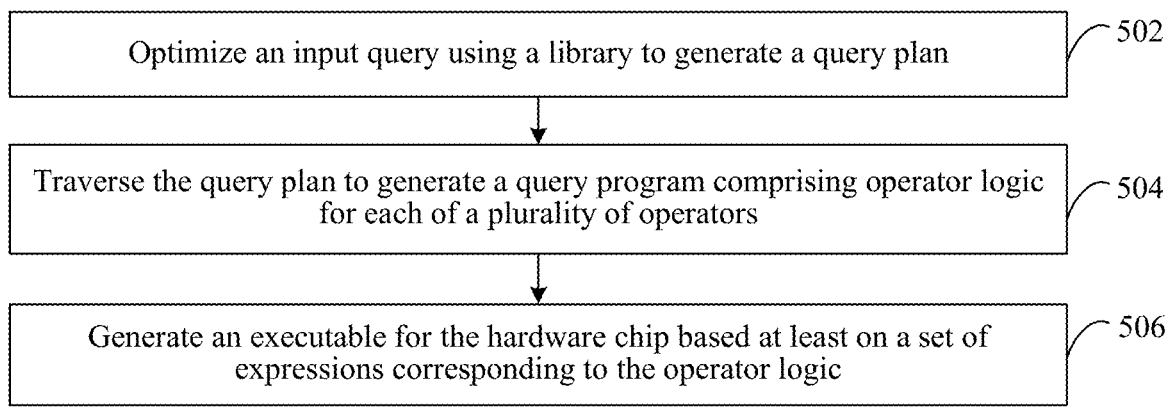
FIG. 5 shows a flowchart of a method for generating an executable for processing a query, in accordance with an example embodiment.

As discussed above, query information can be generated by executable query generator 118 in various ways. For example, FIG. 5 shows a flowchart of a method for generating an executable for processing a query, in accordance with an example embodiment. In an embodiment, flowchart 500 may be implemented by system 200, as shown in FIG. 2. Accordingly, flowchart 500 will be described with reference to FIG. 2. Other structural and operational embodiments will be apparent to persons skilled in the relevant art(s) based on the following discussion regarding flowchart 500 and system 200 of FIG. 2.

Flowchart 500 begins with step 502. In step 502, an input query is optimized using a library to generate a query plan. For instance, with reference to FIG. 2, parser 212 and/or optimizer 216 are configured to obtain input query 210 and optimize the query using one or more of libraries 214 to generate a query plan. As discussed above, the query plan comprises a physical query plan in various embodiments, where the physical query plan includes one or more query operators (e.g., in the form of a graph). In various examples, the query plan may be selected based on a time and/or cost of execution of query 210.

In step 504, the query plan is traversed to generate a query program comprising operator logic for each of a plurality of operators. For instance, with continued reference to FIG. 2, plan converter 220 is configured to traverse the query plan (e.g., based on the operators in the plan) to generate a query program comprising operator logic for each of a plurality of the query operators present in the query plan. For example, plan converter 220 may map each of the query operators in the query plan to a particular set of operator logic (e.g., computational logic or computer code). Upon generating operator logic for each of the query operators in the query plan, a combined set of operator logic is generated representing a query program for executing query 210.

In step 506, an executable is generated for the hardware chip based at least on a set of expressions corresponding to the operator logic. In examples, the hardware chip is configured to execute at least a portion of the set of expressions in parallel. For instance, with reference to FIG. 2, program generator 218 is configured to obtain the query program for executing query 210, and generate an executable for a particular hardware chip (e.g., APU 106) based at least on a set of expressions corresponding to the operator logic.

For example, program generator 218 may first identify a target processing architecture of APU 106 on which the query is to be executed. The identification of the target processing architecture may be based on an input present in query 210. In another example, the identification may be automatically determined (e.g., based on an availability of devices, a current resource usage of devices, etc.). After identifying a target processing architecture (e.g., accelerator 206), program generator 218 may identify expressions corresponding to each operator logic in the query program. In examples, the expressions may be generated in a manner that is specific to the target processing architecture. For instance, if the target processing architecture is accelerator 206, the expressions corresponding to the operator logic in the query program may be accelerator-specific expressions that are to be carried out by accelerator 206 rather than CPU 208. In some examples, the target architecture of APU 106 is configured to execute at least a portion of the set of expressions in parallel (e.g., using multithreading or the like) to improve performance. In other words, the expressions may be generated in such a manner that leverages advantageous characteristics of processing architectures of the target hardware chip (e.g., parallel processing capabilities) such that query execution is improved. Upon generating the expressions, program generator 218 generates an executable for transmission to query program executor 202.

Figure 6:
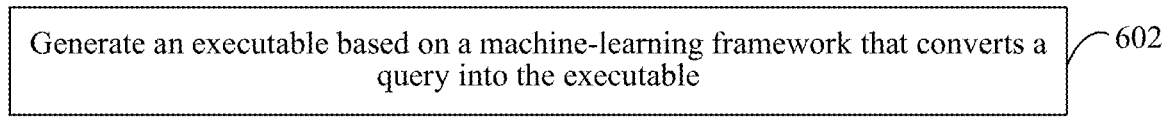
FIG. 6 shows a flowchart of a method for generating an executable based on a machine-learning framework, in accordance with an example embodiment.

As discussed above, the executable may be generated in various ways in example implementations. For example, FIG. 6 shows a flowchart of a method for generating an executable based on a machine-learning framework, in accordance with an example embodiment. In an embodiment, flowchart 600 may be implemented by system 200, as shown in FIG. 2. Accordingly, flowchart 600 will be described with continued reference to FIG. 2. Other structural and operational embodiments will be apparent to persons skilled in the relevant art(s) based on the following discussion regarding flowchart 600 and system 200 of FIG. 2.

Flowchart 600 begins with step 602. In step 602, an executable is generated based on a machine-learning framework that converts a query into the executable. For instance, plan converter 220 and/or program generator 218 may comprise one or more machine-learning frameworks configured to convert a query plan generated by optimizer 216 into an executable that may be executed by a processing architecture of APU 106. In some implementations, the machine-learning framework is configured to configured to utilize machine-learning techniques to generate a neural network program.

III. Additional Example Query Execution Embodiments

A. Introduction

The following sections are intended to describe additional example embodiments in which implementations described herein may be provided. Furthermore, the sections that follow explain additional context for such example embodiments, details relating to the implementations, and evaluations of such implementations. The sections that follow are intended to illustrate various aspects and/or benefits that may be achieved based on techniques described herein, and are not intended to be limiting. Accordingly, while additional example embodiments are described, it is understood that the features and evaluation results described below are not required in all implementations.

In example query processing embodiments, techniques may be implemented by one or more of computing device 102, query processor 104, APU 106, query processing engine 108, shared memory 110, server 114, query workload system 116, executable query generator 118, query program executor 202, result communicator 204, accelerator 206, CPU 208, query 210, parser 214, libraries 214, optimizer 216, program generator 218, or plan converter 22 (including any subcomponents thereof). Other structural and operational implementations will be apparent to persons skilled in the relevant art(s) based on the following discussion.

Disclosed herein are example embodiments for implementing query processing on high-end chiplet devices integrating CPU and GPUs. As described herein, such chiplet devices allow for improvements beyond conventional GPU implementations. For instance, similar characteristics as GPUs may be achieved, but without a drawback of having to transmit data through a PCIe bus.

To show the capabilities that these chiplet devices can obtain, example embodiments implement an extension of a Tensor Query Processor (TQP) able to run Structured Query Language (SQL) queries on a console with a combined CPU/GPU (e.g., a gaming console such as XBox®) with a performance that is comparable to GPU implementations (e.g., an NVIDIA® P100 GPUS), but without the overhead of moving data from a CPU memory to a GPU memory. In examples, a combined CPU/GPU (e.g., an Xbox® gaming console) is equipped with and Advanced Micro Devices® (AMD) CPU/GPU chiplet with a memory bandwidth of around 550 GB/s. For a set of selected queries (e.g., selected from Transaction Processing Performance Council Benchmark H (TCPH)), improvements were achieved (e.g., in the range of 10x) over other implementations, such as CPU-only solutions, while being only marginally slower than the performance of GPU implementations (e.g., P100). In addition, gaming console (e.g., Xbox®) can be implemented at a cloud scale (e.g., due to the Xbox® Cloud Gaming offering) for processing of SQL queries.

Further details are described herein with respect to an identification of a set of limitations of query processing for analytical queries over CPU and GPU, while highlighting CPU/GPU chiplet (e.g., processor devices that combine CPUs and GPUs, also referred to herein as an Accelerated Processing Unit (APU)) devices for analytical workloads. Additional details are also shown with respect to the performance of such devices by running a few selected TPCH queries on a gaming console, compared against a discrete GPU (P100) and CPU baselines.

B. Query Processing on CPUs and GPUs

In this Section, a qualitative assessment is provided regarding Query Processing (QP) of analytical queries on CPUs and GPUs. Certain strengths and limitations of these hardware options are described relating to QP.

Figure 7:
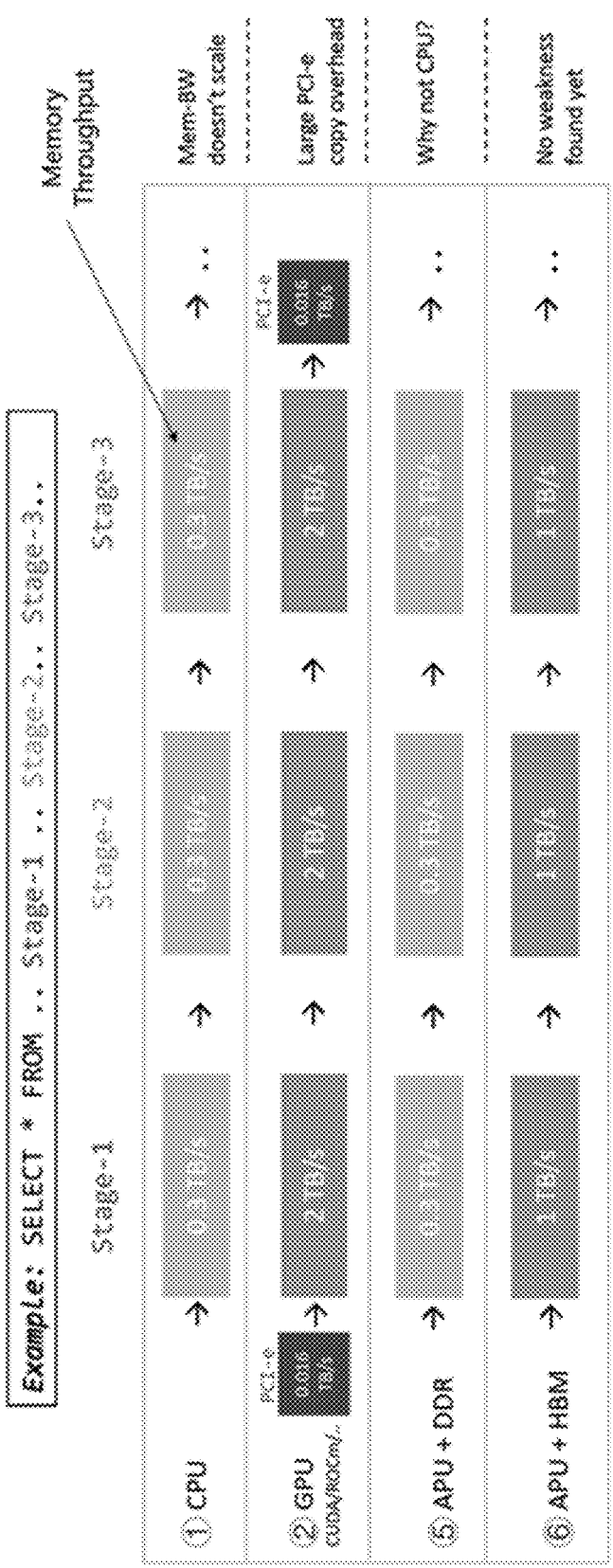
FIG. 7 depicts an example execution of a SQL query on different hardware bookends with different memory bandwidth properties, in accordance with an example embodiment.
Figure 8:
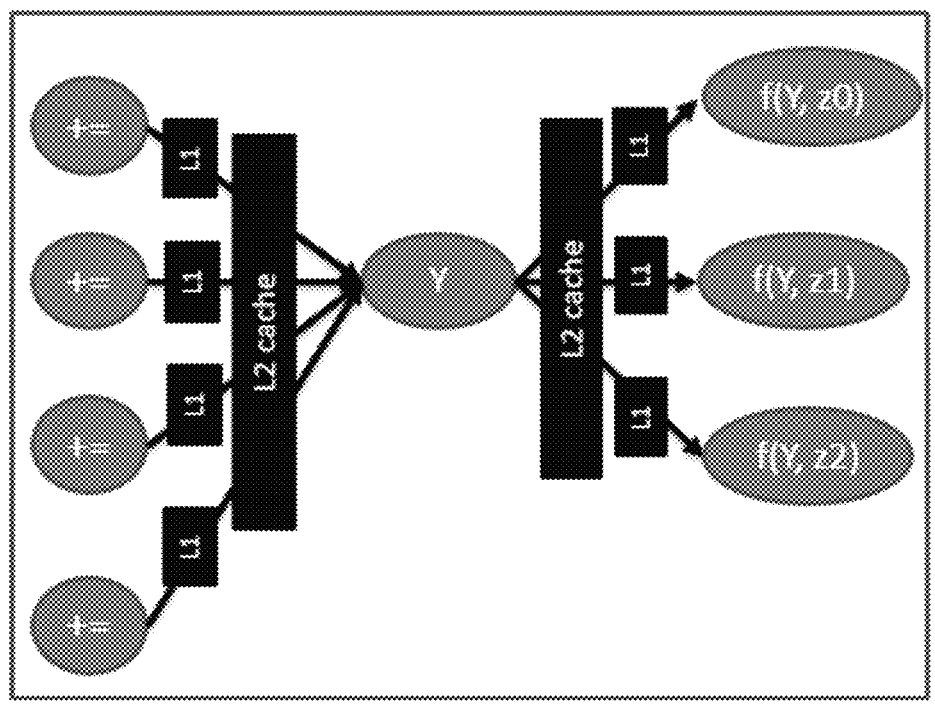
FIG. 8 illustrates an example system of how multiple cores perform a simple sum value aggregation, in accordance with an example embodiment.

FIG. 7 depicts an example execution of a SQL query on different hardware bookends with different memory bandwidth properties, in accordance with an example embodiment. In this example, it is assumed that a SQL query can be executed into three stages requiring one data scan in each stage, and where each stage is memory bound. If this query is executed on a CPU (denoted as "1" in the figure), a throughput of about 300 GB/s can be expected at each stage, which may represent a maximum throughput achievable by Double Data Rate (DDR) memory. In implementations, the bandwidth of the CPU memory is designed such that it aligns with the performance of each of the CPU cores. For instance, increasing the size of a CPU memory bandwidth without increasing the number of CPU cores may result in inadequate bandwidth utilization. However, increasing the number of CPU cores can be expensive in implementations, and therefore may not be cost-effective. For example, each CPU may drain about 10 GB/s of memory bandwidth. If the available memory bandwidth is increased (e.g., to 1 TB/s), such as by leveraging a Sapphire Rapids configuration with a High Bandwidth Memory (HBM) implementation), at least hundreds of CPU cores may be needed to achieve a full utilization. Furthermore, synchronization overhead can also increase together with the number of CPU cores. Since each core performs execution independently, synchronization barriers among the CPU cores can introduce increasing overheads. FIG. 3 illustrates an example system of how multiple cores perform a simple sum value aggregation, in accordance with an example embodiment. In FIG. 8, updated values from one CPU's register have to pass through a Level 2 (L2) cache and broadcasted to other nodes (or otherwise provided to other nodes). This may trigger idle cycles for swapping between cache levels and applying other transactions protocols such as for cache coherence. In some implementations, some cache coherent protocols support cache-to-cache transfers at a Level 1 (L1) stage. In implementations, coherence activity may be determined by application design, thread scheduling, and micro-architectural implementation.

Figure 9:
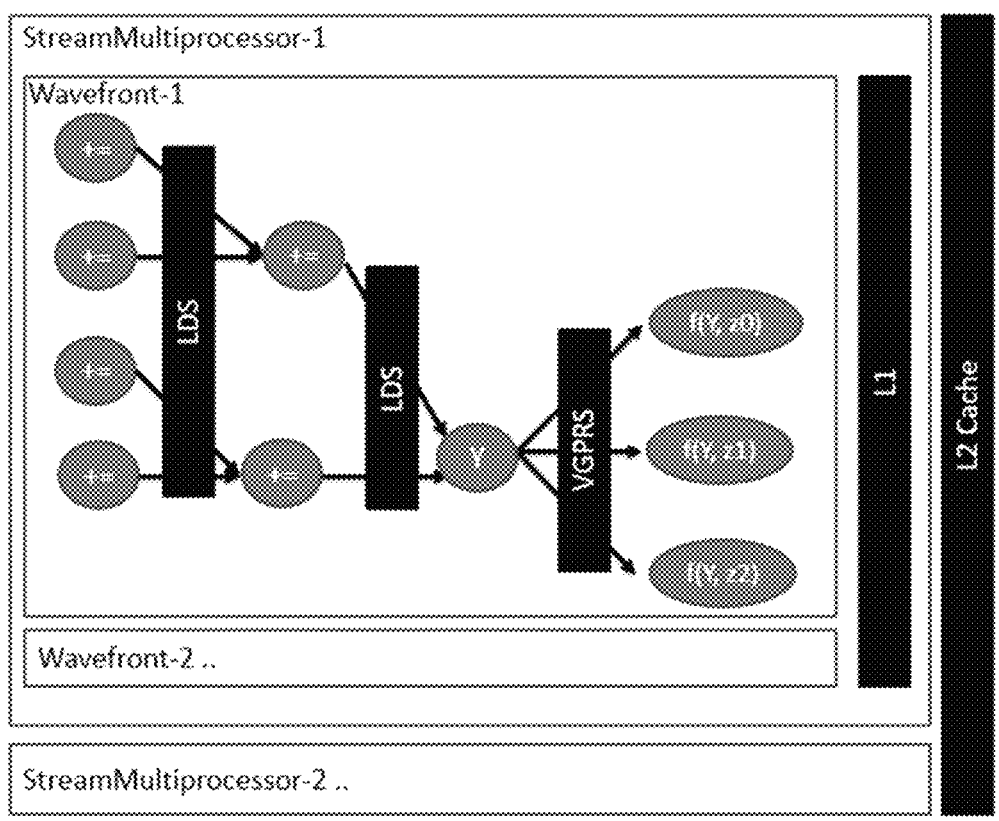
FIG. 9 illustrates an example data synchronization in a system, in accordance with an example embodiment.

QP on GPUs will now be described, denoted as "2" in FIG. 7. In this case, the bandwidths of the HBM memory can be leveraged in each stage, which is around one order of magnitude better than the CPU case. In examples, GPUs also do not suffer from the same synchronization overhands thanks to their design, and in fact, certain GPUs implementations may be equipped with hundreds of thousands of Single instruction, multiple threads (SIMT) cores. In some examples, such cores may be computationally weaker than CPU cores. As a result, a trade-off may be present between single-threaded performance for higher parallelisms. As is shown in FIG. 9, which illustrates an example data synchronization over GPU/APU) in a system 900, a group of threads (usually 32 for NVIDIA/XBox, and 32/64 for AMD) in GPUs form a single wavefront that executes the same instructions at every clock cycle. In this example, data computations within each wavefront is naturally synchronized without any additional overhead. It is also noted that memory and control divergence may add additional overheads. In examples, different wavefronts within the same stream multiprocessor may share data through an L1 cache, which can be more effective than CPU through the L2 cache. In examples, data coherence can be controlled by the user program. One advantage of this is that it can potentially reduce or eliminate the complexity in the processor that would otherwise be required to guarantee coherence through transparent mechanisms. Finally, in some implementations, only data synchronization across stream multiprocessor requires L2 cache. However, that is rarely used as long as user programs are efficiently designed to do synchronization within each single wavefront, or across multiple wavefronts within the same stream multiprocessor.

In some examples, GPUs may be optimized for throughput rather than single-thread latency in contrast to CPUs. Because of the above hardware characteristics, GPUs may outperform CPUs for data analytics workloads as long as the data fits in the (HBM) device memory. However, data is often fetched from higher-capacity locations, such as CPU memory, local or remote storage. This data copy operation may be required to pass through a computer bus (e.g., a PCIe bus) that may have limited bandwidth both compared to the device and the host memory. It is also noted that analytics workloads are mostly read-only in contrast to transactional workloads, so the absence of hardware support for coherence is not problematic in example implementations.

CPU/GPU chiplet devices are now described. A first example is denoted as "5" in FIG. 7. These devices may comprise a similar or same memory bandwidth as CPUs, potentially resulting in similar limitations as CPU-only QP. Indeed, GPUs can be leveraged here for computations, but in general such GPUs may be limited by a memory bandwidth in some implementations. These limitations, however, can be reduced or even avoided in in other CPU/GPU chiplet devices, denoted as "6" in FIG. 7. Examples of such chiplet devices include, but are not limited to Apple M1, AMD MI300, and a gaming console such as Xbox. In this case, QP can leverage the high bandwidth of the HBM memory, while not be limited by a computer bus (e.g., PCIe). Additionally, these devices have adequate computation power to utilize the high memory bandwidth, and do not suffer from the CPU synchronization overhead since the SIMT based wavefront execution of the GPU can be used to achieve low synchronization overhead. In some examples, each core of such chiplet devices are designed with the critical computation instructions only. While the per-core performance may be weaker than regular CPUs due to simper instructions, limited speculation execution and/or the lack of hyper-threading, many more cores can be packed in a single chip, therefore enabling better utilization of the high memory bandwidth. Finally, synchronization between CPU and GPU data access is more flexible, and can be much cheaper compared to data copy PCIe in examples.

Other Hardware Configurations. While example embodiments described herein relate to CPU and GPU implementations, it should be understood that other hardware configurations, such as FPGAs and processing-in-memory (PIM) devices may also be utilized for data analytics workload. For purposes of the disclosure, however, implementations focus on devices that (i) may be production-ready and/or deployable (or already deployed) in the cloud, (ii) be able to store a reasonable about of data (10+ GB size) in memory; and (iii) the devices should be able to execute SQL queries end-to-end, including joins, filters and aggregation among other operations. Finally, some of the limitations noted above with respect to CPU and GPU implementations may also be present for other devices as well (e.g., FPGAs may also rely on PCIe for data transmission, while PIM devices may have lower bandwidth exchange operations).

C. Additional Details

Example implementation. In an example, TQP may be integrated with Antares or another suitable compiler for deep learning models that are able to tune and generate code kernels for different hardware. In some implementations, Antares (or another suitable compiler) may be extended to support execution of set of code on a gaming console. In an example implementation, each input query is first parsed and optimized (e.g., using Apache Spark). A TQP may convert the physical plan generated following the parsing and optimizing into a tree composed of programs (e.g., PyTorch programs), one for each physical operator in the original plan. A suitable package (e.g., PyTorch) is used to freeze the computation graph composed by the PyTorch programs. The frozen computation graph (e.g., in TorchScript format or the like) is provided to a different package (e.g., Antares, or another compiler/optimizer). The compiler/optimizer performs various techniques, such as fusing and/or tuning to generate an optimal program, and a code generator then produces a final executable that may be transmitted to the gaming console for execution. In some implementations, such an implementation is automatic (e.g., without user input).

Hardware Settings. Table 1 shows an example experiment environment based on different hardware settings, standing for CPU, GPU, and APU, respectively. The CPU model is Xeon E5-2690 v4, 2 sockets in total with each socket 14 core supporting 28 threads, the host memory is DD4 2400 formed up with 8 banks. The GPU model is NVIDIA Tesla P100 (PCIe) while the XBox model is standard Series X.

TABLE 1

Example Setup for CPU/GPU/A100

| | Xeon E5-2690v4 | NVIDIA P100 | XBox Series X |
|---|---|---|---|
| Mem Bandwidth (GBps) | 154 | 732 | 560 |
| Unidirectional PCIv3 (GBps) | — | 16 | — |
| Theoretical GFLOPS | 1400 | 9500 | 12000 |

TABLE 2

TPCH End-to-end Latency (SF = 1)

| | Xeon E5-2690v4 | NVIDIA P100 | XBox Series X |
|---|---|---|---|
| TPCH-6 (Filter) | 0.00452731 | 0.02622172 | 0.00044748 |
| TPCH-14 (Case-when) | 0.01188643 | 0.00284473 | 0.00098188 |
| TPCH-17 (Group-by) | 0.11233982 | 0.03002868 | 0.00643542 |
| TPCH-19 (Join) | 0.02886910 | 0.02755484 | 0.00114052 |

TABLE 3

Latency Occupied over PCIe-v3 (SF = 1)

| | NVIDIA P100 | CPU/APU |
|---|---|---|
| TPCH-6 (Filter) | 98.9% | 0% |
| TPCH-14 (Case-when) | 75.4% | 0% |
| TPCH-17 (Group-by) | 83.5% | 0% |
| TPCH-19 (Join) | 96.5% | 0% |

SQL Execution Latency. Table 2 shows a TPCH end-to-end latency in an example implementation, while Table 3 shows a ratio of latency spent over PCIe (v3) data copy. In examples, the NVIDIA P100 may comprise relatively powerful computation capabilities, but its high latency over the PCIe interface reduces its performance advantage on TPCH. In some cases, such as TPCH-6, its performance on a Compute Unified Device Architecture (CUDA) may even be slower than execution on a CPU. On the other hand, the APU-based devices (e.g., XBox Series X) does not have this limitation and outperforms others in all cases in terms of end-to-end latency. However, when comparing the non-PCIe time of P100 and XBox, P100 actually performs faster due to its advantage in memory bandwidth which is higher than Xbox, while computation ability (GFLops) is a secondary factor to benefit SQL performance.

In accordance with the disclosed techniques, an APU architecture offers a more efficient solution by bringing the CPU and GPU closer together, allowing for SQL computations to be performed without the need for data to be copied via PCIe between the CPU and GPU. Moreover, with APU implementations, SQL can take advantage of the GPU-inspired processor design to perform multi-thread computations efficiently, without the need to always access Cache L2. Moreover, when working with SQL data, memory bandwidth may be more critical than computation ability (TFLops), as data scanning is the primary bottleneck.

IV. Example Mobile Device and Computer System Implementation

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code (program instructions) configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 10:
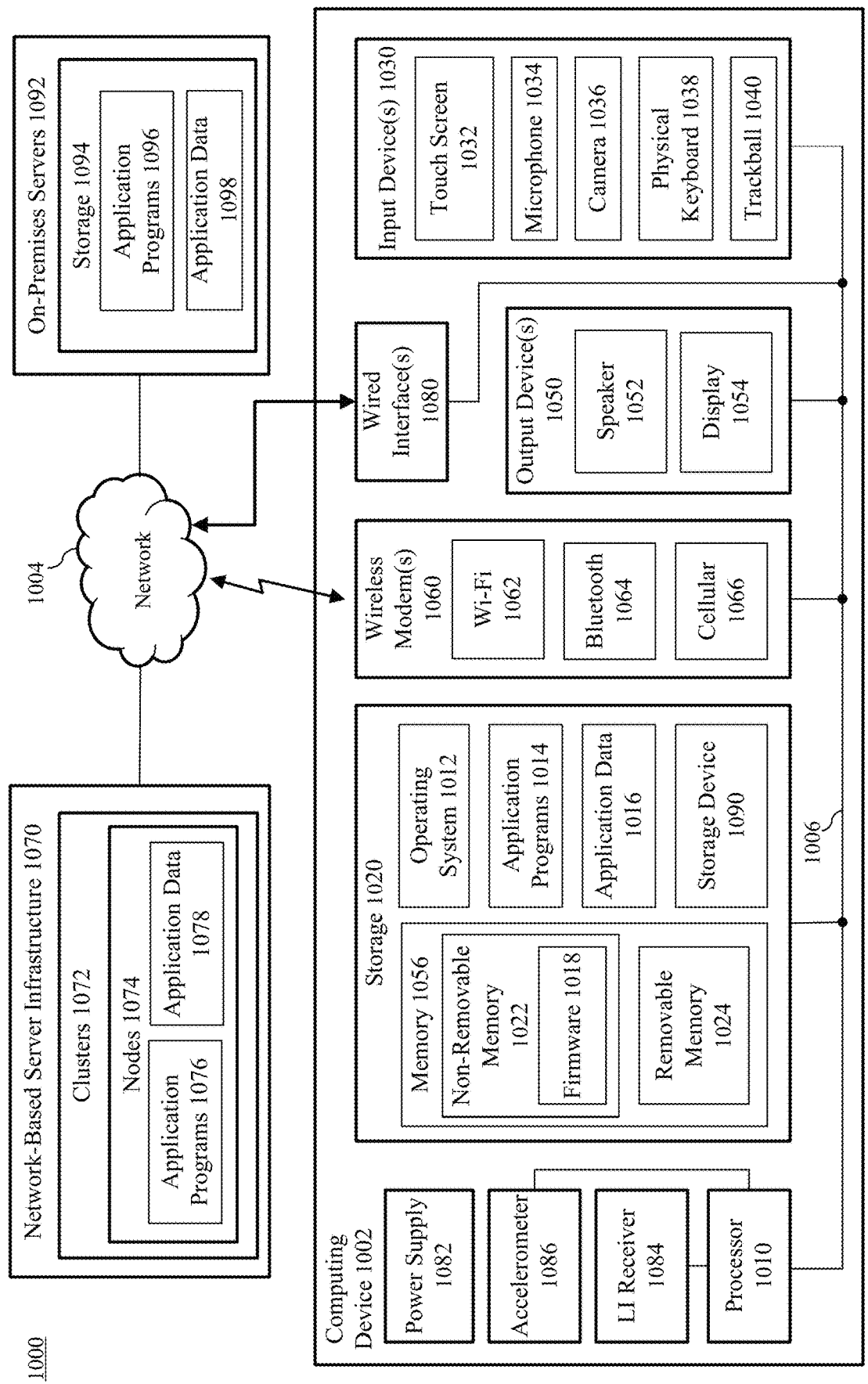
FIG. 10 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 10. FIG. 10 shows a block diagram of an exemplary computing environment 1000 that includes a computing device 1002. Computing device 1002 is an example of gaming console 102 and/or server 114 of FIG. 1, which may include one or more of the components of computing device 1002. In some embodiments, computing device 1002 is communicatively coupled with devices (not shown in FIG. 10) external to computing environment 1000 via network 1004. Network 1004 comprises one or more networks such as local area networks (LANs), wide area networks (WANs), enterprise networks, the Internet, etc., and may include one or more wired and/or wireless portions. Network 1004 may additionally or alternatively include a cellular network for cellular communications. Computing device 1002 is described in detail as follows.

Computing device 1002 can be any of a variety of types of computing devices. For example, computing device 1002 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 1002 may alternatively be a stationary computing device such as a desktop computer, a personal computer (PC), a stationary server device, a minicomputer, a mainframe, a supercomputer, etc.

As shown in FIG. 10, computing device 1002 includes a variety of hardware and software components, including a processor 1010, a storage 1020, one or more input devices 1030, one or more output devices 1050, one or more wireless modems 1060, one or more wired interfaces 1080, a power supply 1082, a location information (LI) receiver 1084, and an accelerometer 1086. Storage 1020 includes memory 1056, which includes non-removable memory 1022 and removable memory 1024, and a storage device 1090. Storage 1020 also stores an operating system 1012, application programs 1014, and application data 1016. Wireless modem(s) 1060 include a Wi-Fi modem 1062, a Bluetooth modem 1064, and a cellular modem 1066. Output device(s) 1050 includes a speaker 1052 and a display 1054. Input device(s) 1030 includes a touch screen 1032, a microphone 1034, a camera 1036, a physical keyboard 1038, and a trackball 1040. Not all components of computing device 1002 shown in FIG. 10 are present in all embodiments, additional components not shown may be present, and any combination of the components may be present in a particular embodiment. These components of computing device 1002 are described as follows.

A single processor 1010 (e.g., central processing unit (CPU), microcontroller, a microprocessor, signal processor, ASIC (application specific integrated circuit), and/or other physical hardware processor circuit) or multiple processors 1010 may be present in computing device 1002 for performing such tasks as program execution, signal coding, data processing, input/output processing, power control, and/or other functions. Processor 1010 may be a single-core or multi-core processor, and each processor core may be single-threaded or multithreaded (to provide multiple threads of execution concurrently). Processor 1010 is configured to execute program code stored in a computer readable medium, such as program code of operating system 1012 and application programs 1014 stored in storage 1020. The program code is structured to cause processor 1010 to perform operations, including the processes/methods disclosed herein. Operating system 1012 controls the allocation and usage of the components of computing device 1002 and provides support for one or more application programs 1014 (also referred to as "applications" or "apps"). Application programs 1014 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 1002 can communicate with any other component according to function, although not all connections are shown for ease of illustration. For instance, as shown in FIG. 10, bus 1006 is a multiple signal line communication medium (e.g., conductive traces in silicon, metal traces along a motherboard, wires, etc.) that may be present to communicatively couple processor 1010 to various other components of computing device 1002, although in other embodiments, an alternative bus, further buses, and/or one or more individual signal lines may be present to communicatively couple components. Bus 1006 represents one or more of any of several types of bus structures, including a memory bus or memory controller, a peripheral bus, an accelerated graphics port, and a processor or local bus using any of a variety of bus architectures.

Storage 1020 is physical storage that includes one or both of memory 1056 and storage device 1090, which store operating system 1012, application programs 1014, and application data 1016 according to any distribution. Non-removable memory 1022 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 1022 may include main memory and may be separate from or fabricated in a same integrated circuit as processor 1010. As shown in FIG. 10, non-removable memory 1022 stores firmware 1018, which may be present to provide low-level control of hardware. Examples of firmware 1018 include BIOS (Basic Input/Output System, such as on personal computers) and boot firmware (e.g., on smart phones). Removable memory 1024 may be inserted into a receptacle of or otherwise coupled to computing device 1002 and can be removed by a user from computing device 1002. Removable memory 1024 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 1090 may be present that are internal and/or external to a housing of computing device 1002 and may or may not be removable. Examples of storage device 1090 include a hard disk drive, a SSD, a thumb drive (e.g., a USB (Universal Serial Bus) flash drive), or other physical storage device.

One or more programs may be stored in storage 1020. Such programs include operating system 1012, one or more application programs 1014, and other program modules and program data. Examples of such application programs may include, for example, computer program logic (e.g., computer program code/instructions) for implementing one or more of query processor 104, query processing engine 108, query workload system 116, executable query generator 118, query program executor 202, result communicator 204, libraries 214, parser 212, optimizer 216, program generator 218, and/or plan converter 220, along with any components and/or subcomponents thereof, as well as any other features illustrated and/or described herein, including portions thereof, and/or further examples described herein.

Storage 1020 also stores data used and/or generated by operating system 1012 and application programs 1014 as application data 1016. Examples of application data 1016 include web pages, text, images, tables, sound files, video data, and other data, which may also be sent to and/or received from one or more network servers or other devices via one or more wired or wireless networks. Storage 1020 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 1002 through one or more input devices 1030 and may receive information from computing device 1002 through one or more output devices 1050. Input device(s) 1030 may include one or more of touch screen 1032, microphone 1034, camera 1036, physical keyboard 1038 and/or trackball 1040 and output device(s) 1050 may include one or more of speaker 1052 and display 1054. Each of input device(s) 1030 and output device(s) 1050 may be integral to computing device 1002 (e.g., built into a housing of computing device 1002) or external to computing device 1002 (e.g., communicatively coupled wired or wirelessly to computing device 1002 via wired interface(s) 1080 and/or wireless modem(s) 1060). Further input devices 1030 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1054 may display information, as well as operating as touch screen 1032 by receiving user commands and/or other information (e.g., by touch, finger gestures, virtual keyboard, etc.) as a user interface. Any number of cach type of input device(s) 1030 and output device(s) 1050 may be present, including multiple microphones 1034, multiple cameras 1036, multiple speakers 1052, and/or multiple displays 1054.

One or more wireless modems 1060 can be coupled to antenna(s) (not shown) of computing device 1002 and can support two-way communications between processor 1010 and devices external to computing device 1002 through network 1004, as would be understood to persons skilled in the relevant art(s). Wireless modem 1060 is shown generically and can include a cellular modem 1066 for communicating with one or more cellular networks, such as a GSM network for data and voice communications within a single cellular network, between cellular networks, or between the mobile device and a public switched telephone network (PSTN). Wireless modem 1060 may also or alternatively include other radio-based modem types, such as a Bluetooth modem 1064 (also referred to as a "Bluetooth device") and/or Wi-Fi modem 1062 (also referred to as an "wireless adaptor"). Wi-Fi modem 1062 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1064 is configured to communicate with another Bluetooth-capable device according to the Bluetooth short-range wireless technology standard(s) such as IEEE 802.15.1 and/or managed by the Bluetooth Special Interest Group (SIG).

Computing device 1002 can further include power supply 1082, LI receiver 1084, accelerometer 1086, and/or one or more wired interfaces 1080. Example wired interfaces 1080 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 1080 of computing device 1002 provide for wired connections between computing device 1002 and network 1004, or between computing device 1002 and one or more devices/peripherals when such devices/peripherals are external to computing device 1002 (e.g., a pointing device, display 1054, speaker 1052, camera 1036, physical keyboard 1038, etc.). Power supply 1082 is configured to supply power to each of the components of computing device 1002 and may receive power from a battery internal to computing device 1002, and/or from a power cord plugged into a power port of computing device 1002 (e.g., a USB port, an A/C power port). LI receiver 1084 may be used for location determination of computing device 1002 and may include a satellite navigation receiver such as a Global Positioning System (GPS) receiver or may include other type of location determiner configured to determine location of computing device 1002 based on received information (e.g., using cell tower triangulation, etc.). Accelerometer 1086 may be present to determine an orientation of computing device 1002.

Note that the illustrated components of computing device 1002 are not required or all-inclusive, and fewer or greater numbers of components may be present as would be recognized by one skilled in the art. For example, computing device 1002 may also include one or more of a gyroscope, barometer, proximity sensor, ambient light sensor, digital compass, etc. Processor 1010 and memory 1056 may be co-located in a same semiconductor device package, such as being included together in an integrated circuit chip, FPGA, or system-on-chip (SOC), optionally along with further components of computing device 1002.

In embodiments, computing device 1002 is configured to implement any of the above-described features of flowcharts herein. Computer program logic for performing any of the operations, steps, and/or functions described herein may be stored in storage 1020 and executed by processor 1010.

In some embodiments, server infrastructure 1070 may be present in computing environment 1000 and may be communicatively coupled with computing device 1002 via network 1004. Server infrastructure 1070, when present, may be a network-accessible server set (e.g., a cloud-based environment or platform). As shown in FIG. 10, server infrastructure 1070 includes clusters 1072. Each of clusters 1072 may comprise a group of one or more compute nodes and/or a group of one or more storage nodes. For example, as shown in FIG. 10, cluster 1072 includes nodes 1074. Each of nodes 1074 are accessible via network 1004 (e.g., in a "cloud-based" embodiment) to build, deploy, and manage applications and services. Any of nodes 1074 may be a storage node that comprises a plurality of physical storage disks, SSDs, and/or other physical storage devices that are accessible via network 1004 and are configured to store data associated with the applications and services managed by nodes 1074. For example, as shown in FIG. 10, node 1074 may store application data 1078.

Each of nodes 1074 may, as a compute node, comprise one or more server computers, server systems, and/or computing devices. For instance, a node 1074 may include one or more of the components of computing device 1002 disclosed herein. Each of nodes 1074 may be configured to execute one or more software applications (or "applications") and/or services and/or manage hardware resources (e.g., processors, memory, etc.), which may be utilized by users (e.g., customers) of the network-accessible server set. For example, as shown in FIG. 10, nodes 1074 may operate application programs 1076. In an implementation, a node of nodes 1074 may operate or comprise one or more virtual machines, with each virtual machine emulating a system architecture (e.g., an operating system), in an isolated manner, upon which applications such as application programs 1076 may be executed.

In an embodiment, one or more of clusters 1072 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 1072 may be a datacenter in a distributed collection of datacenters. In embodiments, exemplary computing environment 1000 comprises part of a cloud-based platform such as Amazon Web Services® of Amazon Web Services, Inc., or Google Cloud Platform™ of Google LLC, although these are only examples and are not intended to be limiting.

In an embodiment, computing device 1002 may access application programs 1076 for execution in any manner, such as by a client application and/or a browser at computing device 1002. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 1002 may additionally and/or alternatively synchronize copies of application programs 1014 and/or application data 1016 to be stored at network-based server infrastructure 1070 as application programs 1076 and/or application data 1078. For instance, operating system 1012 and/or application programs 1014 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 1020 at network-based server infrastructure 1070.

In some embodiments, on-premises servers 1092 may be present in computing environment 1000 and may be communicatively coupled with computing device 1002 via network 1004. On-premises servers 1092, when present, are hosted within an organization's infrastructure and, in many cases, physically onsite of a facility of that organization. On-premises servers 1092 are controlled, administered, and maintained by IT (Information Technology) personnel of the organization or an IT partner to the organization. Application data 1098 may be shared by on-premises servers 1092 between computing devices of the organization, including computing device 1002 (when part of an organization) through a local network of the organization, and/or through further networks accessible to the organization (including the Internet). Furthermore, on-premises servers 1092 may serve applications such as application programs 1096 to the computing devices of the organization, including computing device 1002. Accordingly, on-premises servers 1092 may include storage 1094 (which includes one or more physical storage devices such as storage disks and/or SSDs) for storage of application programs 1096 and application data 1098 and may include one or more processors for execution of application programs 1096. Still further, computing device 1002 may be configured to synchronize copies of application programs 1014 and/or application data 1016 for backup storage at on-premises servers 1092 as application programs 1096 and/or application data 1098.

Embodiments described herein may be implemented in one or more of computing device 1002, network-based server infrastructure 1070, and on-premises servers 1092. For example, in some embodiments, computing device 1002 may be used to implement systems, clients, or devices, or components/subcomponents thereof, disclosed elsewhere herein. In other embodiments, a combination of computing device 1002, network-based server infrastructure 1070, and/or on-premises servers 1092 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1020. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1014) may be stored in storage 1020. Such computer programs may also be received via wired interface(s) 1080 and/or wireless modem(s) 1060 over network 1004. Such computer programs, when executed or loaded by an application, enable computing device 1002 to implement features of embodiments discussed herein. Accordingly, such computer programs represent controllers of the computing device 1002.

Embodiments are also directed to computer program products comprising computer code or instructions stored on any computer-readable medium or computer-readable storage medium. Such computer program products include the physical storage of storage 1020 as well as further physical storage types.

V. Additional Example Embodiments

A system for processing queries is disclosed herein. The system includes: a processor; and a memory device that stores program code structured to cause the processor to: receive query information over a network for processing a query; load, by a first processing architecture, a set of data associated with the query into a shared memory; access, by a second processing architecture, the set of data from the shared memory, the first processing architecture, the second processing architecture, and the shared memory integrated in a hardware chip; process the query information based on the set of data accessed from the shared memory using the second processing architecture to generate a query result; and provide the query result over the network.

In one implementation of the foregoing system, the first processing architecture and the second processing architecture are implemented in a processing chip of a gaming console.

In another implementation of the foregoing system, the first processing architecture comprises a central processing unit (CPU) and the second processing architecture comprises a graphics processing unit (GPU).

In another implementation of the foregoing system, the query comprises a Structured Query Language (SQL) query.

In another implementation of the foregoing system, the program code is structured to cause the processor to access the data by a direct memory access of the shared memory using the second processing architecture.

In another implementation of the foregoing system, the access of the data does not comprise transmitting the data between the first processing architecture and the second processing architecture over a communication bus.

In another implementation of the foregoing system, the query information comprises an executable that is generated based on a machine-learning framework that converts the query into the executable.

In another implementation of the foregoing system, the query information comprises an executable that is generated by: optimizing the query using a library to generate a query plan; traversing the query plan to generate a query program comprising operator logic for each of a plurality of operators; and generating the executable for the hardware chip based at least on a set of expressions corresponding to the operator logic, the hardware chip being configured to execute at least a portion of the set of expressions in parallel.

A method for processing queries is disclosed herein. The method includes: receiving query information over a network for processing a query; loading, by a first processing architecture, a set of data associated with the query into a shared memory; accessing, by a second processing architecture, the set of data from the shared memory, the first processing architecture, the second processing architecture, and the shared memory integrated in a hardware chip; processing the query information based on the set of data accessed from the shared memory using the second processing architecture to generate a query result; and providing the query result over the network.

In one implementation of the foregoing method, the first processing architecture and the second processing architecture are implemented in a processing chip of a gaming console.

In another implementation of the foregoing method, the first processing architecture comprises a central processing unit (CPU) and the second processing architecture comprises a graphics processing unit (GPU).

In another implementation of the foregoing method, the query comprises a Structured Query Language (SQL) query.

In another implementation of the foregoing method, the accessing the data comprises accessing the data by a direct memory access of the shared memory using the second processing architecture.

In another implementation of the foregoing method, the accessing the data does not comprise transmitting the data between the first processing architecture and the second processing architecture over a communication bus.

In another implementation of the foregoing method, the query information comprises an executable that is generated based on a machine-learning framework that converts the query into the executable.

In another implementation of the foregoing method, the query information comprises an executable that is generated by optimizing the query using a library to generate a query plan; traversing the query plan to generate a query program comprising operator logic for each of a plurality of operators; and generating the executable for the hardware chip based at least on a set of expressions corresponding to the operator logic, the hardware chip being configured to execute at least a portion of the set of expressions in parallel.

A computer-readable storage medium is disclosed herein. The computer-readable storage medium has computer program code recorded thereon that when executed by at least one processor causes the at least one processor to perform a method comprising: receiving query information over a network for processing a query; loading, by a first processing architecture, a set of data associated with the query into a shared memory; accessing, by a second processing architecture, the set of data from the shared memory, the first processing architecture, the second processing architecture, and the shared memory integrated in a hardware chip; processing the query information based on the set of data accessed from the shared memory using the second processing architecture to generate a query result; and providing the query result over the network.

In one implementation of the foregoing computer-readable storage medium, the first processing architecture comprises a central processing unit (CPU) and the second processing architecture comprises a graphics processing unit (GPU).

In another implementation of the foregoing computer-readable storage medium, the accessing the data comprises accessing the data by a direct memory access of the shared memory using the second processing architecture.

In another implementation of the foregoing computer-readable storage medium, the query information comprises an executable that is generated based on a machine-learning framework that converts the query into the executable.

VI. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, computing devices, servers, device management services, virtual machine provisioners, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (e.g., or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (e.g., computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments.

What is claimed is:

1. A system for processing queries, the system comprising:
   a processor; and
   a memory device that stores program code structured to cause the processor to:
      receive an executable over a network for processing a query, the executable being generated by:
         mapping each operator in a graph of operators corresponding to the query to a code implementation based on a machine-learning framework, resulting in a set of code implementations for the graph, and
         generating the executable based on the set of code implementations, the executable comprising a neural network program;
      determine a time that a device in a cloud-based infrastructure has a reduced demand;
      load, by a first processing architecture, a set of data associated with the query into a shared memory of the device;
      access, by a second processing architecture, the set of data from the shared memory, the first processing architecture, the second processing architecture, and the shared memory integrated in a hardware chip of the device;
      process the executable based on the set of data accessed from the shared memory using the second processing architecture to generate a query result during the time that the device has the reduced demand; and
      provide the query result over the network.

2. The system of claim 1, wherein the first processing architecture and the second processing architecture are implemented in a processing chip of a gaming console.

3. The system of claim 1, wherein the first processing architecture comprises a central processing unit (CPU) and the second processing architecture comprises a graphics processing unit (GPU).

4. The system of claim 1, wherein the query comprises a Structured Query Language (SQL) query.

5. The system of claim 1, wherein the program code is structured to cause the processor to access the data by a direct memory access of the shared memory using the second processing architecture.

6. The system of claim 5, wherein the access of the data does not comprise transmitting the data between the first processing architecture and the second processing architecture over a communication bus.

7. The system of claim 1, wherein the executable is generated based at least on:
   optimizing the query using a library to generate a query plan;
   traversing the query plan to generate the set of code implementations; and
   generating the executable for the hardware chip based at least on a set of expressions corresponding to the set of code implementations, the hardware chip being configured to execute at least a portion of the set of expressions in parallel.

8. A method for processing queries, comprising:
   receiving an executable over a network for processing a query, the executable being generated by:
      mapping each operator in a graph of operators corresponding to the query to a code implementation based on a machine-learning framework, resulting in a set of code implementations for the graph, and
      generating the executable based on the set of code implementations, the executable comprising a neural network program;
   determining a time that a device in a cloud-based infrastructure has a reduced demand;
   loading, by a first processing architecture, a set of data associated with the query into a shared memory of the device;
   accessing, by a second processing architecture, the set of data from the shared memory, the first processing architecture, the second processing architecture, and the shared memory integrated in a hardware chip of the device;
   processing the executable based on the set of data accessed from the shared memory using the second processing architecture to generate a query result during the time that the device has the reduced demand; and
   providing the query result over the network.

9. The method of claim 8, wherein the first processing architecture and the second processing architecture are implemented in a processing chip of a gaming console.

10. The method of claim 8, wherein the first processing architecture comprises a central processing unit (CPU) and the second processing architecture comprises a graphics processing unit (GPU).

11. The method of claim 8, wherein the query comprises a Structured Query Language (SQL) query.

12. The method of claim 8, wherein the accessing the data comprises accessing the data by a direct memory access of the shared memory using the second processing architecture.

13. The method of claim 12, wherein the accessing the data does not comprise transmitting the data between the first processing architecture and the second processing architecture over a communication bus.

14. The method of claim 8, wherein the executable is generated based at least in part on:
optimizing the query using a library to generate a query plan;
traversing the query plan to generate the set of code implementations; and
generating the executable for the hardware chip based at least on a set of expressions corresponding to the set of code implementations, the hardware chip being configured to execute at least a portion of the set of expressions in parallel.

15. A computer-readable storage medium having computer program code recorded thereon that when executed by at least one processor causes the at least one processor to perform a method comprising:
receiving an executable over a network for processing a query, the executable being generated by:
mapping each operator in a graph of operators corresponding to the query to a code implementation based on a machine-learning framework, and
generating the executable based on the set of code implementations, the executable comprising a neural network program;
determine a time that a device in a cloud-based infrastructure has a reduced demand;
loading, by a first processing architecture, a set of data associated with the query into a shared memory of the device;
accessing, by a second processing architecture, the set of data from the shared memory, the first processing architecture, the second processing architecture, and the shared memory integrated in a hardware chip of the device;
processing the executable based on the set of data accessed from the shared memory using the second processing architecture to generate a query result during the time that the device has the reduced demand; and
providing the query result over the network.

16. The computer-readable storage medium of claim 15, wherein the first processing architecture comprises a central processing unit (CPU) and the second processing architecture comprises a graphics processing unit (GPU).

17. The computer-readable storage medium of claim 15, wherein the accessing the data comprises accessing the data by a direct memory access of the shared memory using the second processing architecture.

18. The system of claim 1, wherein the executable comprises a deep neural network program.

19. The method of claim 8, wherein the executable comprises a deep neural network program.

20. The computer-readable storage medium of claim 15, wherein the executable comprises a deep neural network program.

* * * * *